United States Patent [19]

Sakagami et al.

[11] Patent Number: 4,650,833

[45] Date of Patent: Mar. 17, 1987

[54] THIN TRANSPARENT POLYTETRAFLUOROETHYLENE FILM AND PRODUCTION PROCESS THEREOF

[75] Inventors: Teruo Sakagami; Noriyuki Arakawa; Naohiro Murayama, all of Iwaki, Japan

[73] Assignee: Kureha Chemical Industry Co., Tokyo, Japan

[21] Appl. No.: 704,876

[22] Filed: Feb. 25, 1985

[30] Foreign Application Priority Data

Mar. 7, 1984 [JP] Japan .................... 59-43153

[51] Int. Cl.$^4$ .................... C08F 214/22; C08F 8/22; C08F 14/22; C08J 7/12
[52] U.S. Cl. .................... 525/356; 525/326.4; 427/248.1; 526/255
[58] Field of Search .................... 525/356, 326.4; 427/248.1; 526/255

[56] References Cited

U.S. PATENT DOCUMENTS

| | | | |
|---|---|---|---|
| 2,435,537 | 2/1948 | Ford et al. | 526/255 |
| 2,497,046 | 2/1949 | Kropa | 525/330.7 |
| 3,639,510 | 2/1972 | Paine | 525/356 |
| 3,758,450 | 9/1973 | Margrave et al. | 525/356 |

FOREIGN PATENT DOCUMENTS

| | | | |
|---|---|---|---|
| 57-187329 | 11/1982 | Japan | 427/248.1 |
| 9187006-A | 10/1984 | Japan | 525/356 |

OTHER PUBLICATIONS

Schonhorn et al., "Surface Treatment of Polymers...", 1968, *J. of App. Poly Sci.*, pp. 1231–1237.

*Primary Examiner*—Carman J. Seccuro
*Attorney, Agent, or Firm*—Parkhurst & Oliff

[57] ABSTRACT

Disclosed herein is a thin transparent polytetrafluoroethylene film having:

(1) a film thickness of 0.1–100 μm;
(2) a parallel light transmittance of at least 70% (as measured in accordance with JIS K 7105); and
(3) a tensile strength of at least 1 kg/mm$^2$ (as measured in accordance with JIS K 6887 except for the use of a pulling speed of 10 mm/min.).

The film is produced by fluorinating with a fluorine gas a thin film formed from a solution of a fluoroethylene polymer having an inherent viscosity of at least 2.5 dl/g (as measured at a temperature of 30° C. and a solution concentration of 0.4 g/dl) in accordance with the casting process and having a thickness of 0.1–100 μm.

4 Claims, 4 Drawing Figures

THIN TRANSPARENT POLYTETRAFLUOROETHYLENE FILM AND PRODUCTION PROCESS THEREOF

BACKGROUND OF THE INVENTION

(1) Field of the Invention

This invention relates to a thin transparent polytetrafluoroethylene film having high transparency and strength and a production process thereof.

(2) Description of the Prior Art

Polytetrafluoroethylene (hereinafter called "PTFE") is widely used owing to its various merits, including its large electrical resistance, low surface tension and excellent mechanical properties in addition to its high heat and chemical resistance. It is however difficult to form PTFE into a thin film by the melt-forming technique due to its high melting point (327° C.) and high polymerization degree. As also well known, it is difficult to form PTFE into a thin film by the casting process because due to lack of suitable solvent, it is also difficult to dissolve PTFE into a solution. Although it is possible to obtain thin films having thicknesses of about 25 μm by cutting work or the like, the resultant thin films are usually white and opaque since such a method is susceptible of developing microvoids and PTFE is highly crystalline.

It has recently been proposed, as a process for obtaining formed PTFE articles, to fluorinate formed articles of a fluoroethylene polymer with fluorine gas so that the polymer precursor is converted to PTFE while kept in the shape of its formed articles [see for example Shinozaki, Iwasaki, Okazaki, "Preprint of the 29th Autumn Annual Conference of the Japan Chemical Society", 3H13 (October, 1973)]. There are available a variety of soluble or meltable polymer precursors. Therefore, thin PTFE films can be obtained when such soluble or meltable polymers are selected and their thin films (for example, thin cast films formed from their solutions) are then fluorinated. However, as far as the present inventors are aware of, thin PTFE films obtained in accordance with the above process are generally insufficient in mechanical strength and are so fragile that they are readily broken even when held by hands.

SUMMARY OF THE INVENTION

With the above-mentioned present circumstances of PTFE in view, the present inventors have carried out an investigation so as to obtain thin PTFE films having high transparency and mechanical strength. As a result, the present invention has been brought about.

In one aspect of this invention, there is thus provided a thin transparent, polytetrafluoroethylene film having:

(1) a film thickness of 0.1–100 μm;
(2) a parallel light transmittance of at least 70% (as measured in accordance with JIS K 7105); and
(3) a tensile strength of at least 1 kg./mm$^2$ (as measured in accordance with JIS K 6887 except for the use of a pulling speed of 10 mm/min.).

In another aspect of this invention, there is also provided a process for producing a thin transparent polytetrafluoroethylene film having:

(1) a film thickness of 0.1–100 μm;
(2) a parallel light transmittance of at least 70% (as measured in accordance with JIS K 7105); and
(3) a tensile strength of at least 1 kg/mm$^2$ (as measured in accordance with JIS K 6887 except for the use of a pulling speed of 10 mm/min.), which process comprises fluorinating with a fluorine gas a thin film formed from a solution of a fluoroethylene polymer having an inherent viscosity of at least 2.5 dl/g (as measured at a temperature of 30° C. and a solution concentration of 0.4 g/dl) in accordance with the casting process and having a thickness of 0.1–100 μm.

The thin PTFE film of this invention has both transparency and great mechanical strength. It is surprising from the above-described known techniques that the thin PTFE film of this invention has both of these properties at the same time.

Since thin PTFE films having such high transparency and mechanical strength and thicknesses in the range of 0.1–100 μm have not been known to date, their utility has been obviously unknown. Owing to these properties, along with the above-mentioned properties inherent to PTFE, thin PTFE films according to this invention are expected to find their utility in other areas such as the electrical and electronic fields.

As mentioned above, thin PTFE films obtained by the fluorination of thin films of a polymer precursor were fragile. Even in such a prior art process, a polymer precursor having a certain degree of polymerization was used. Therefore, it can be said to be absolutely unexpected that the use of a polymer precursor having a specific polymerization degree in the present invention has provided thin films incomparably tougher than conventional fragile thin PTFE films.

The above and other objects, features and advantages of the present invention will become apparent from the following description and the appended claims, taken in conjunction with the accompanying drawings.

BRIEF DESCRIPTION OF THE DRAWINGS

In the accompanying drawings:

FIG. 1 shows an infrared absorption spectrum of a VDF-TFE (vinylidene fluoride-trifluoroethylene) copolymer;

FIG. 2 illustrates an infrared absorption spectrum of the same VDF-TFE copolymer after its fluorination;

FIG. 3 depicts an infrared absorption spectrum of PVDF (polyvinylidene fluoride);

FIG. 4 illustrates an infrared absorption spectrum of the same PDVF after its fluorination.

DETAILED DESCRIPTION OF THE INVENTION AND PREFERRED EMBODIMENTS

Figure 1:
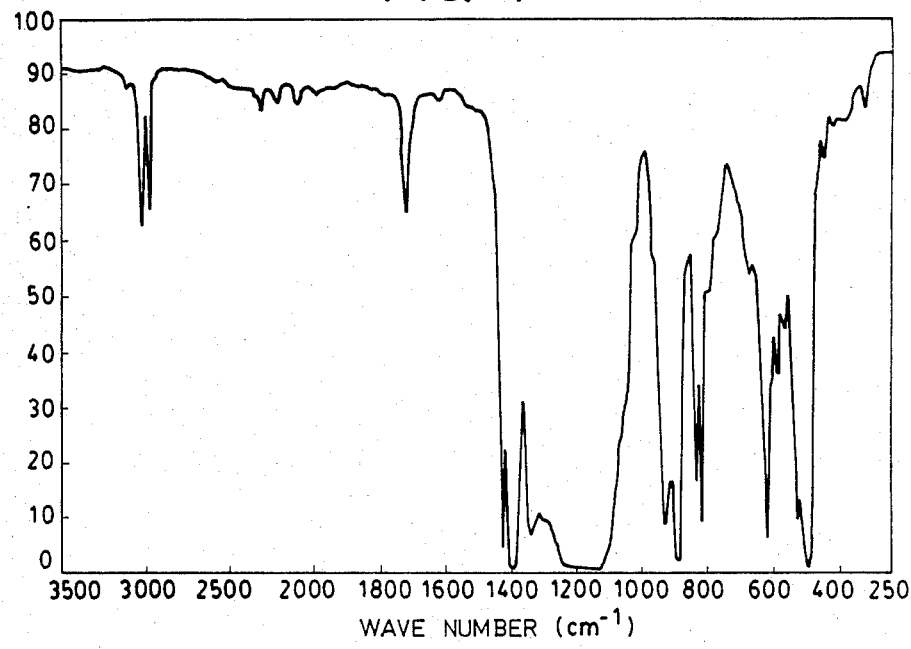
FIGS. 1 through 4 are reproductions of infrared absorption spectra of polymers either before or after their fluorination.

The thin transparent PTFE film of this invention has a film thickness of 0.1–100 μm or especially, 0.5–50 μm.

One of the great features of the thin PTFE film resides in its transparency. The term "transparency" as used herein means that expressed in terms of parallel light transmittance measured in accordance with the method prescribed under JIS K 7105. This value is at least 70% for the thin PTFE film of this invention, with a value of 80–93% or so being typical.

Part of JIS K 7105 relevant to the measurement of parallel light transmittance reads as follows:

Measuring Method

The measurement shall be performed according to the following procedures (using an integrating sphere type measuring apparatus):

(a) Fit a transfer standard white plate, adjust the indicator of the apparatus at 100 ($T_1$), and adjust the quantity of the incident light.

(b) With the transfer standard white plate fitted, attach the test piece, and measure the quantity of the total transmitted light ($T_2$).

(c) Detach the transfer standard white plate and test piece, attach a light trap, and measure the quantity of scattering light of the apparatus ($T_3$).

(d) With the light trap attached, attach the test piece, and measure the quantity of scattered light produced by the apparatus and test piece ($T_4$).

Method of Calculation

The total light transmittance, diffuse transmittance, and parallel light transmittance shall be calculated from the following formulas:

$$T_t = T_2$$

$$T_d = T_4 - T_3(T_2/100)$$

$$T_p = T_t - T_d$$

where $T_t$: total light transmittance (%)
$T_d$: diffuse transmittance (%)
$T_p$: parallel light transmittance (%)

The other feature that characterizes the thin PTFE film of this invention in combination with the transparency is great mechanical strength. More specifically, this means that the tensile strength is at least 1 kg/mm². The tensile strength of thin PTFE films of this invention may generally range from 2 kg/mm² to 20 kg/mm². By the way, the term "tensile strength" as used herein means a value measured by means of a commercial tensile test machine ("TENSIRON" manufactured by Toyo-Baldwin Co., Ltd.) in accordance with JIS K 6887 except for the use of a pulling speed of 10 mm/min.

Part of JIS K 6887 relevant to the measurement of tensile strength of PTFE film reads as follows:

Tensile Strength

Cut the test specimens about 200 mm in length from the sample, in the cutting direction.

Put gauge marks at a distance of 50 mm from on the center of the test specimen, and attach the test specimen to the tensile tester so that 100 mm of length is held between two grips, and subject to the tensile test at the tension rate of 200±20 mm per minute in relative movement velocity. This test shall be carried out at a room temperature of 25°±2° C.

Calculate the tensile strength, T (kgf/cm²) (N/mm²) from the load at the rupture of the specimen by the following formula:

$$T = P/A$$

where,

P: load applied onto specimen at the rupture (kgf) (N)
A: cross-sectional area of specimen before test (mm²)

Calculate the arithmetic mean from the test results of five test specimens.

Production of Thin Transparent PTFE Film

The production process of this invention, which is adapted to obtain a thin transparent PTFE film, comprises fluorinating a thin film which has been formed from a solution of a specific polymer precursor in accordance with the casting process.

Polymer precursor

The polymer precursor is a fluoroethylene polymer. By the term "fluoroethylene" as used herein is meant a compound formed by substituting at least one hydrogen atom of ethylene with a fluorine atom. Specific examples of the fluoroethylene may include vinyl fluoride, vinylidene fluoride (hereinafter called "VDF"), trifluoroethylene and 1,2-difluoroethylene as well as tetrafluoroethylene (hereinafter called "TFE") satisfying certain conditions which will be described herein. The term "polymer" as used herein should embrace both homopolymers and copolymers. Accordingly, the term "fluoroethylene polymer" as used herein includes besides the homopolymers of the above-mentioned individual fluoroethylenes, copolymers of two or more fluoroethylenes selected from these fluoroethylenes and copolymers of at least one of these fluoroethylenes and at least one co-monomer copolymerizable with said at least one fluoroethylene. Specific examples of such a co-monomer, include lower alpha-olefins, e.g., ethylene and propylene, fluoropropylenes, e.g., hexafluoropropene, and so on. From the viewpoint of production of a thin PTFE film, it is preferred to employ such a co-monomer that can be converted to TEE by fluorination. Therefore, the co-monomer may preferably be a lower alpha-olefin, especially ethylene, and their fluoro-derivatives. The co-monomer may however be such a monomer that cannot be converted to TFE, so long as the thin film resulted from the fluorination can be considered practically as a thin PTFE film, in other words, the co-monomer is used in small proportion.

The polymer precursor must be soluble in a given solvent, because a film has to be formed from its solution by the casting process. Accordingly, the fluoroethylene polymer as the polymer precursor cannot generally be the homopolymer of TFE because there is no suitable solvent for the homopolymer of TFE.

Illustrative of the fluoroethylene polymer suitable for use in the present invention may include the homopolymers of the above-described fluoroethylenes, e.g., polyvinylidene fluoride (PVDF), and copolymers of such fluoroethylenes, e.g., TFE-VDF copolymer as well as copolymers of fluoroethylenes and co-monomers, e.g., TFE-ethylene copolymer, trifluoroethylene-ethylene copolymer, etc.

A VDF polymer is preferred as the polymer precursor from such reasons that it can be readily formed into a thin film by the casting process and its fluorination is easy. PDVF and TFE-VDF copolymer are particularly preferred. Generally speaking, a copolymer containing TFE as one component thereof is meritorious from the viewpoint of fluorination. It is however difficult to form it into a thin film by the casting process if the proportion of the thus copolymerized TFE should be too much, because any excess use of TFE results in a copolymer having extremely poor solubility. Accordingly, a VDF polymer which is preferred as the polymer precursor may consist principally of VDF and 0–65 mole % of TFE (the term "mole %" being based on the total amount of VDF and TFE). An especially-preferred VDF polymer is a VDF-TFE copolymer in which the TFE content is 0–50 mole %.

One of features of the process of this invention resides in that the polymer precursor to be fluorinated has a high polymerization degree. Namely, the polymer precursor must have an inherent viscosity of at least 2.5 dl/g or preferably at least 3.0 dl/g when measured under conditions of a solution concentration of 0.4 g/dl and a temperature of 30° C. In the case of polymer precursors having inherent viscosities lower than 2.5 dl/g, it is only possible to obtain fragile films even when their thin films are fluorinated into thin PTFE films. The solvent useful in the measurement of the inherent viscosity may be suitably chosen depending on each polymer precursor to be used. For the above-mentioned preferred VDF-TFE copolymer (TFE content: 0–60 mole %) for instance, dimethylformamide, dimethylacetamide, tetraethylurea or the like may be used. Of these, dimethylacetamide is a typical solvent. Thus, the inherent viscosity of the VDE-TFE copolymer can be considered to be a value measured using dimethylacetamide as a solvent.

Formation of Film

Since the polymer precursor useful in the practice of this invention has a high polymerization degree as described above, it is difficult to form it into a thin film by the melt-forming technique. Accordingly, a solution of the polymer precursor is formed into a film by the casting process in the present invention.

Here, the solvent may be suitably selected depending on each polymer precursor to be used. A usable solvent may generally be a polar compound containing at least one atom of N, O, S and P or at least one of N, O, S and P atoms. Its specific examples have already been referred to in connection with the measurement of inherent viscosity. It is routine practice to use the same solvent as that employed for the measurement of inherent viscosity.

The preparation of a solution for the casting process, the casting of the solution to the surface of a support, the removal of the used solvent, and other conditions and procedures for the practice of the casting process are all not substantially different from the conventional casting process, although they may be changed or modified as needed depending on the type of each polymer, to which the casting process is to be applied, and the type of each solvent to be employed.

The thickness of the thus-obtained film of the polymer precursor may be 0.1–100 $\mu$m or preferably 0.5–50 $\mu$m. Since the polymer precursor has a high polymerization degree in the present invention, the resultant thin film has sufficient strength even if its thickness is as small as 0.1 $\mu$m or so. On the other hand, a film having a thickness in excess of 100 $\mu$m lacks uniformity due to its high polymerization degree and does not permit easy and even fluorination into the interior thereof, thereby failing to provide an intended thin film.

Fluorination

The fluorination of a thin film of a fluoroethylene polymer by fluorine gas has been known as mentioned above. Therefore, the fluorination may be carried out in a desired manner which is in conformity with the object of this invention.

Specifically speaking, the gas employed for the fluorination may be pure $F_2$ gas or a diluted $F_2$ gas. Therefore, the expression "fluorinated with a fluorine gas" as used herein includes both of such cases.

Since polymer molecules may be subjected to simultaneous cleavage or crosslinking reactions in the course of their fluorination treatment by the fluorine gas, it is desirable to use a fluorine gas diluted suitably in accordance with the type of the polymer precursor used and its resistance to fluorine gas. Generally speaking, it is suitable that the fluorinating gas has an $F_2$ content of 1% or higher. As the diluting gas, it is appropriate to employ a gas inert to $F_2$ and the polymer precursor, for example, nitrogen, argon, helium and the like. Furthermore, it is preferred to carry out the fluorination under such conditions that $F_2$ is present in a stoichiometrically large excess. A trace amount of oxygen is contained in a fluorine gas which is routinely available. This oxygen is known to oxidize and cut high molecules and to enter their end group in the form of —COF during fluorination. For this reasons, it is necessary to use a fluorine gas containing oxygen as little as possible. In the present invention, it is preferred to use a fluorinating gas having an oxygen concentration of 1% or less, or more preferably 0.5% or less.

The temperature of the fluorination reaction may vary considerably in accordance with such parameters as the type of the used polymer precursor, its resistance to fluorine, the content of $F_2$ gas, etc. A temperature range of from room temperature to about 200° C. is often used. The fluorination reaction may be carried out under either reduced pressure or elevated pressure.

The fluorination reaction may be effected either batchwise or by the flow method. The fluorination may be performed at once or may be effected in several stages while successively raising the degree of fluorination.

The melting point of the polymer, to which the fluorination is being applied, goes up significantly as the fluorination proceeds. The polymer is eventually converted to PTFE. The formation of PTFE can be observed through the measurement of infrared absorption spectra.

EXAMPLES

EXAMPLE 1

An aqueous solution containing methyl cellulose as an additive and other materials was charged into an autoclave made of stainless steel and fitted with a stirrer. After adding, as a polymerization initiator, diisopropylperoxy dicarbonate in an amount of 0.1 part by weight per 100 parts by weight of a monomer which consisted of 50 mole % of VDF and 50 mole % of TFE, the monomer was introduced. Polymerization was conducted at 20° C. The inherent viscosity of the resulting random two-component copolymer of VDF-TFE (50/50 mole %) was measured under conditions of 30° C. and 0.4 g/dl (solvent: dimethylacetamide). It was found to be 9.8 dl/g. From a 1.0 wt. % dimethylacetamide solution of the copolymer, a thin film of about 20 $\mu$m thick was obtained by the casting process. An infrared absorption spectrum of the thin film is shown in FIG. 1. This film was placed in a reactor made of Monel metal and the reactor was evacuated by a vacuum pump to $6 \times 10^{-3}$ mmHg. Thereafter, the interior of the reactor was kept at 80° C. By charging a fluorine gas (air content: 0.5 wt. % or less) little by little, the interior pressure of the reactor was raised to normal pressure (the amount of the fluorine gas was in large excess compared with the polymer). Thereafter, the reactor was kept at 80° C. for 2 hours as it was. Then, the temperature in the reactor was raised little by little to 130° C. in the course of 1 hour. The reactor was then allowed to stand for 45 hours while maintained at 130° C.

Figure 2:
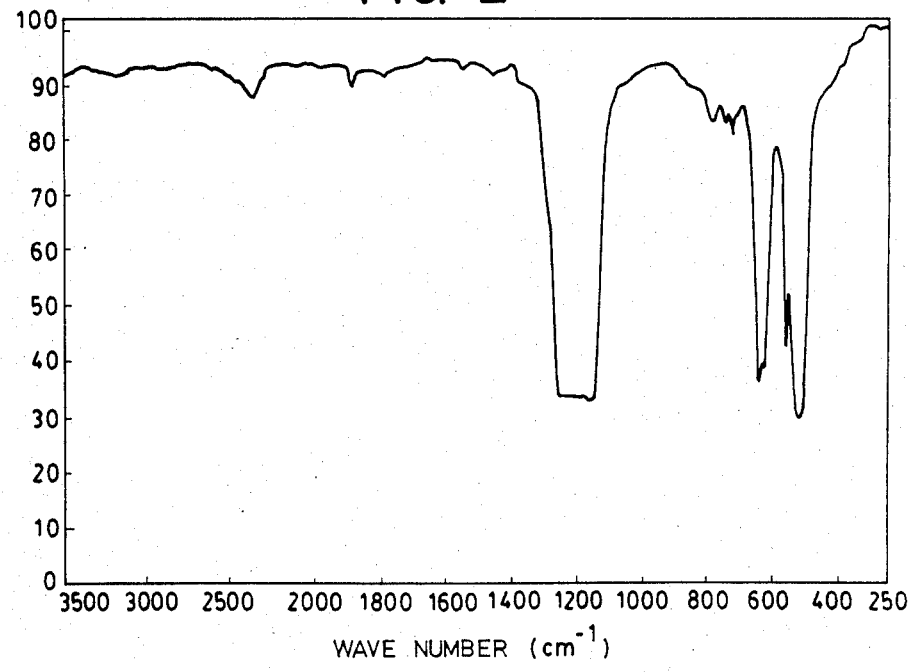

An infrared absorption spectrum (transmission) of a copolymer of this example, which was fluorinated in the above-described manner, is shown in FIG. 2. As apparent from FIG. 2, the infrared absorption spectrum indicates that the polymer precursor had been changed to PTFE. The crystalline melting point of the thin film was measured using a differential scanning calorimeter (Model IB; manufactured by Parkin-Elmer Corp.). It was found to be 325° C.

Furthermore, with respect to the above thin film, its elongation and tensile strength were measured by means of a tensile test machine ("TENSIRON" manufactured by Toyo-Baldwin Co., Ltd.; pulling speed: 10 mm/min.). The following results were obtained. From the results, it is envisaged that the thin PTFE film of this example has good elongation and strength withstandable in actual applications.

| Elongation | 11.2% |
| Strength | 3 kg/mm$^2$ |

Then, using a haze meter (manufactured by Tokyo Denshoku K.K.; HAZE METER TC-HIII), the parallel light transmittance of the thin film was determined in accordance with JIS K 7105. It was found to be 90.4%. Namely, the thin PTFE film of this Example was indicated to be transparent. By way of comparison, a thin PTFE film (thickness: 50 μm) prepared by the cutting technique had a parallel light transmittance of 43% and was hence white and fully opaque.

COMPARATIVE EXAMPLE 1

In the same manner as in Example 1, polymerization was carried out using the polymerization initiator in an amount of 1.1 parts by weight per 100 parts by weight of the monomer so that a copolymer of VDF and TFE (molar ratio: 50:50) was synthetically obtained. The inherent viscosity of the copolymer was measured under conditions of 30° C. and 0.4 g/dl (solvent: dimethylacetamide). It was found to be 1.2 dl/g. Using this copolymer, a thin film of 20 μm thick was prepared from its dimethylacetamide solution. Upon fluorination in the same manner as in Example 1, the thus-fluorinated thin copolymer film did not have any sufficient strength. Even when picked up by fingers, it was broken into pieces. It was thus impossible to measure its physical properties. Therefore, it was totally useless for actual applications.

EXAMPLE 2

Figure 3:
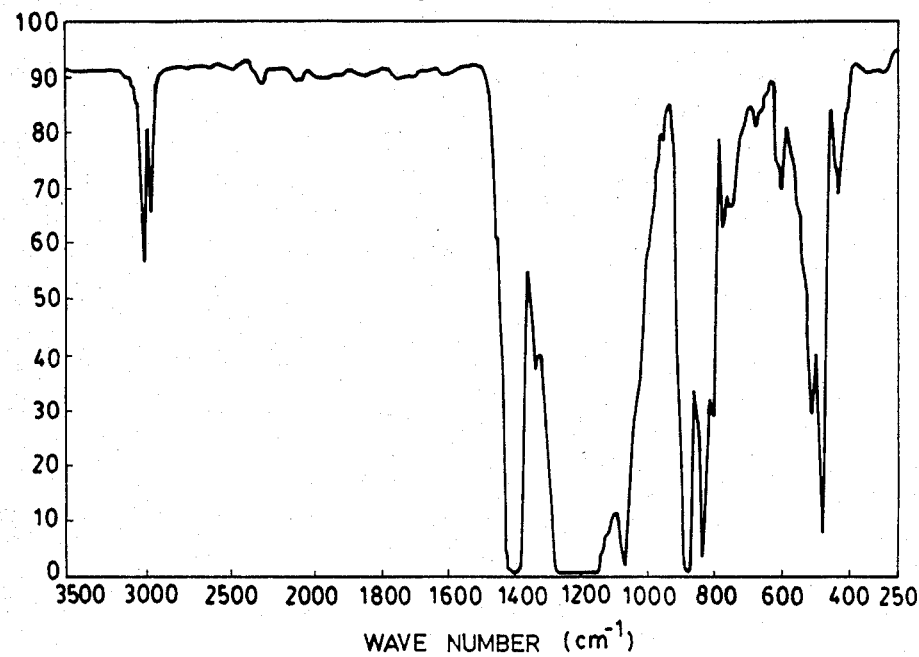
Figure 4:
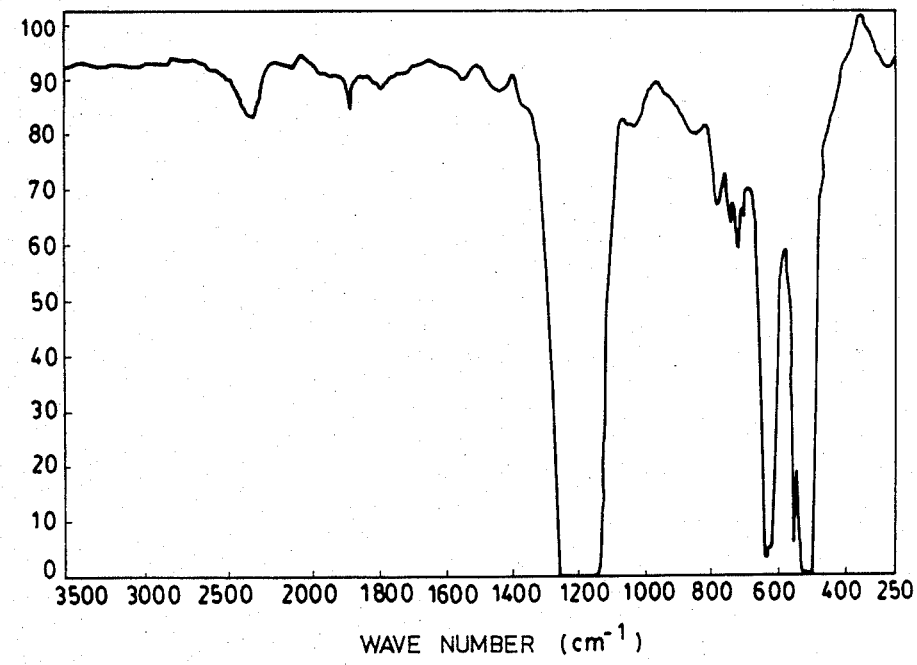

Following the procedures of Example 1 except for the exclusion of TFE, polymerization was carried out at 20° C. using the polymerization initiator in an amount of 0.1 part by weight per 100 parts by weight of the monomer to obtain polyvinylidene fluoride (PVDF) of a high polymerization degree. Its inherent viscosity was measured at 30° C. as a 0.4 g/dl dimethylformamide solution. It was found to be 6.6 dl/g. A 3 wt. % dimethylformamide solution of the PVDF was prepared. From this solution, a thin film of about 16 μm thick was obtained in accordance with the casting process. An infrared absorption spectrum of this thin film is depicted in FIG. 3. This thin film was then fluorinated at normal pressure in the same manner as in Example 1. The fluorination was carried out under conditions of 3 hours at 60° C. at first, 16 hours at 90° C. and thereafter 24 hours at 130° C. An infrared absorption spectrum (transmission) of the thus-obtained thin film of this Example is illustrated in FIG. 4, from which it is understood that the polymer of the resultant thin film is PTFE. The elongation and tensile strength of the thin film were 20.4% and 3 kg/mm$^2$ respectively. Thus, this thin film had a high elongation and was relatively soft. Then, the dielectric constant and dielectric tangent, tan δ, were measured at 20° C. and 1 KHz. The following data were obtained. Namely, the polymer of the thin film showed data which are substantially close to those of PTFE.
Dielectric constant: 2.2–2.3
tan δ: 0.015%
The parallel light transmittance of the thin film was 89.2%. Hence, the thin film had excellent transparency.

COMPARATIVE EXAMPLE 2

A biaxially-oriented thin film (thickness: 25μm) of PVDF having an inherent viscosity of 1.0 dl/g as measured under conditions of 30° C. and 0.4 g/dl (solvent: dimethylformamide) was fluorinated in the same manner as in Example 2. However, the resultant thin film did not have sufficient strength. It was so weak that it was broken into pieces even when picked up by fingers.

Having now fully described the invention, it will be apparent to one of ordinary skill in the art that many changes and modifications can be made thereto without departing from the spirit or scope of the invention as set forth herein.

We claim:

1. A process for producing a thin transparent polytetrafluoroethylene film, comprising:
   fluorinating a thin film formed by casting from a solution of vinylidene fluoride polymer with a fluorine gas, wherein said vinylidene fluoride polymer has an inherent viscosity of at least 2.5 dl/g, and said thin film has a thickness of 0.1–100 μm, said vinylidene fluoride polymer comprising vinylidene fluoride and 0–65 mole % tetrafluoroethylene based on the total amount of said vinylidene fluoride and said tetrafluoroethylene, and wherein said thin transparent polytetrafluoroethylene film has:
   (1) a film thickness of 0.1–100 μm;
   (2) a parallel light transmittance of at least 70%; and
   (3) a tensile strength of at least 1 kg/mm$^2$.

2. A process according to claim 1, wherein the solution of the vinylidene fluoride polymer comprises a solvent selected from the group consisting of dimethylformamide, dimethylacetamide and tetraethylurea.

3. A process according to claim 1, wherein the fluorine gas is a diluted fluorine gas.

4. A process according to claim 1, wherein the fluorine gas has an oxygen content of at most 1%.

* * * * *